April 26, 1966      F. J. LUKETA      3,247,612
TRAWL DOOR WITH LONGITUDINAL ANTERIOR VANES
Filed Aug. 31, 1964      6 Sheets-Sheet 2
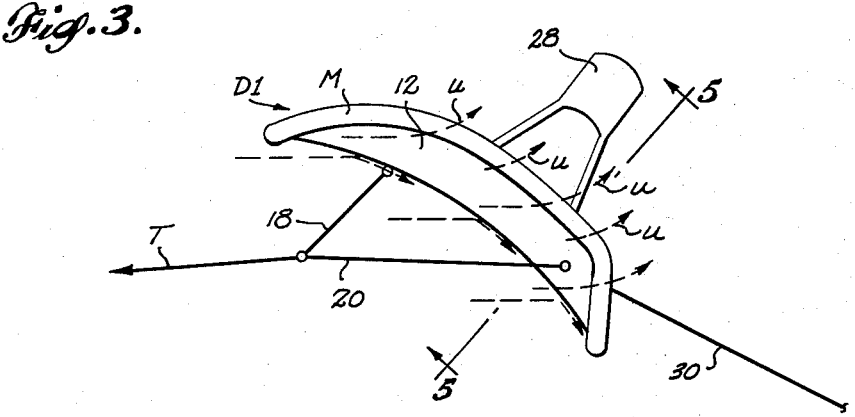
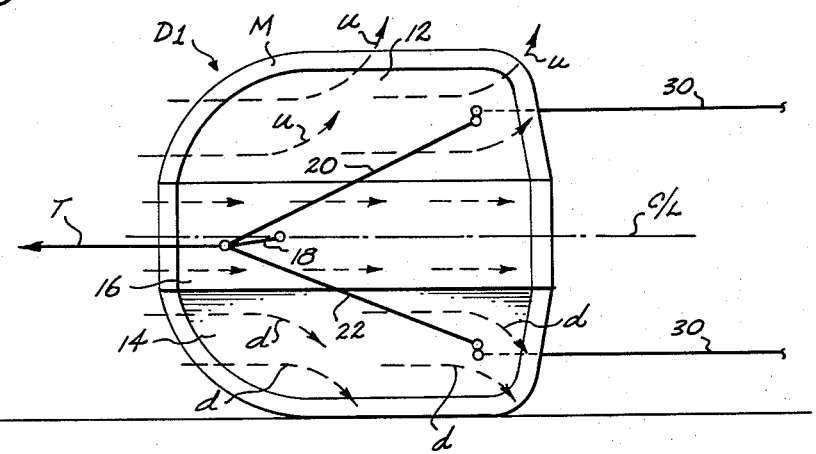
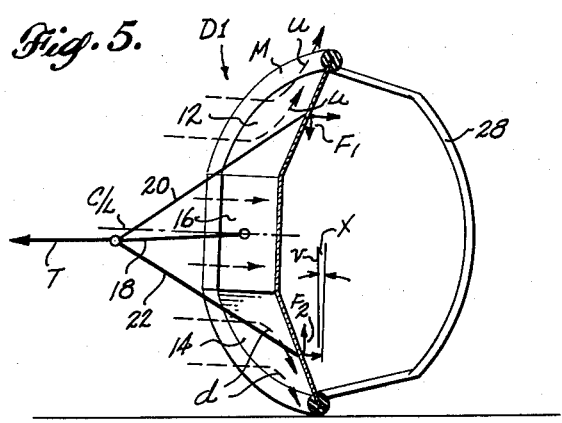
INVENTOR.
FRANK J. LUKETA
BY *Mathis & Graybeal*
ATTORNEYS

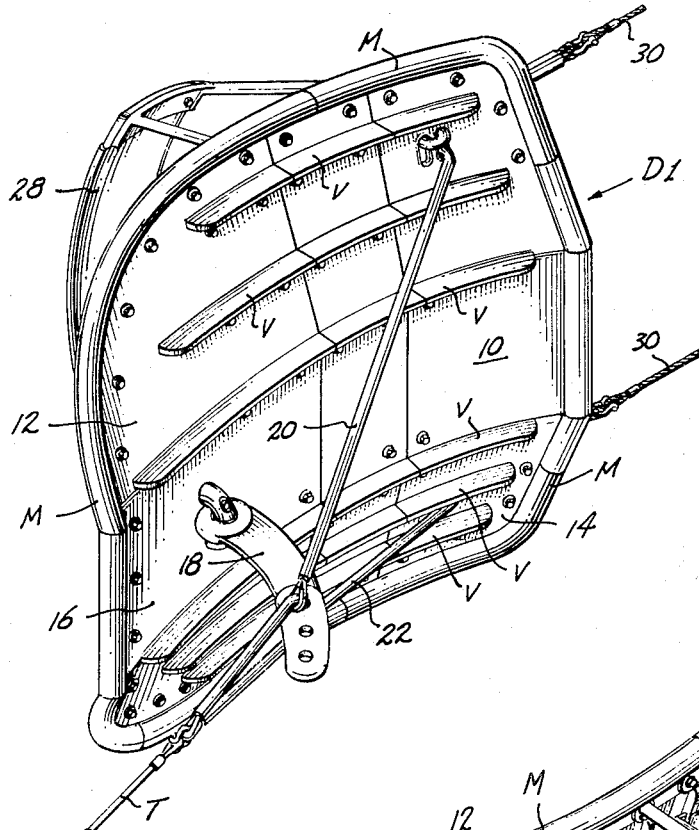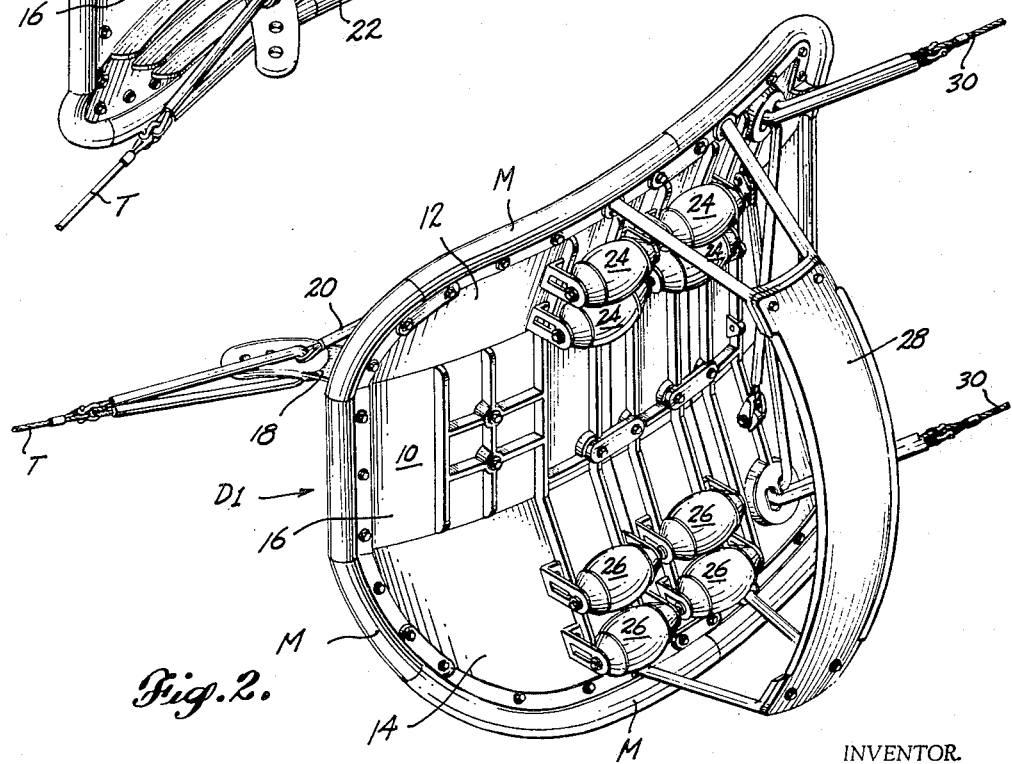

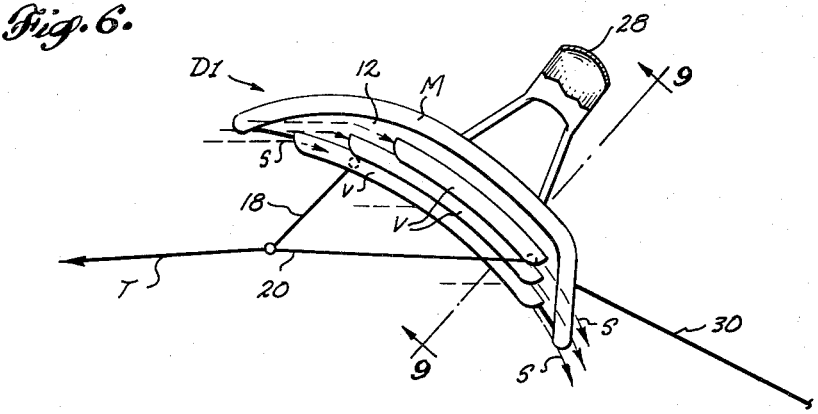
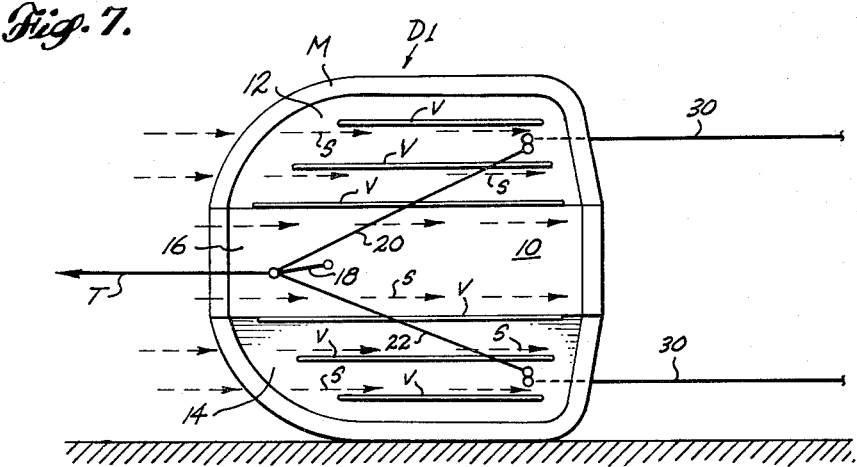
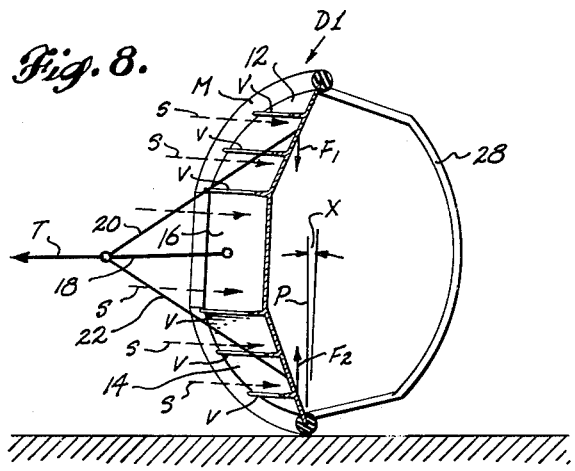
INVENTOR.
FRANK J. LUKETA
BY
ATTORNEYS

April 26, 1966  F. J. LUKETA  3,247,612
TRAWL DOOR WITH LONGITUDINAL ANTERIOR VANES
Filed Aug. 31, 1964  6 Sheets-Sheet 4

INVENTOR.
FRANK J. LUKETA
BY Mattus & Graybeal
ATTORNEYS

INVENTOR.
FRANK J. LUKETA
BY Mattus & Graybeal
ATTORNEYS

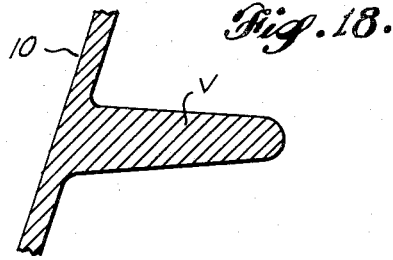
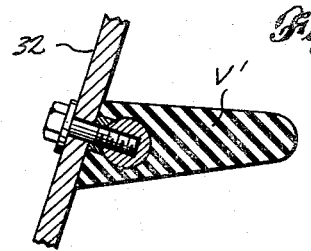
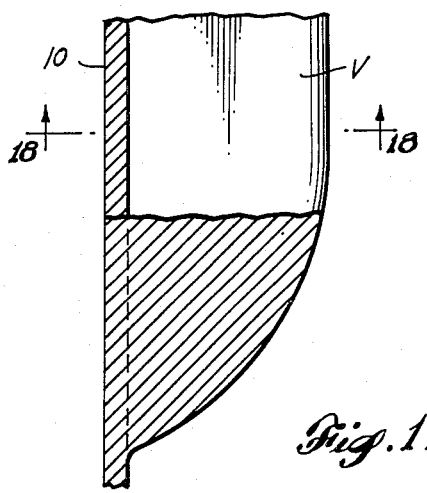
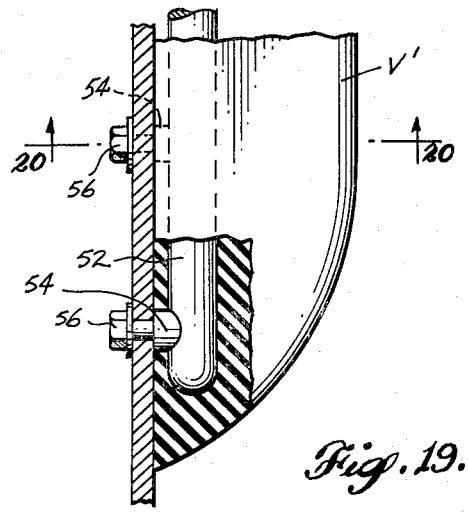
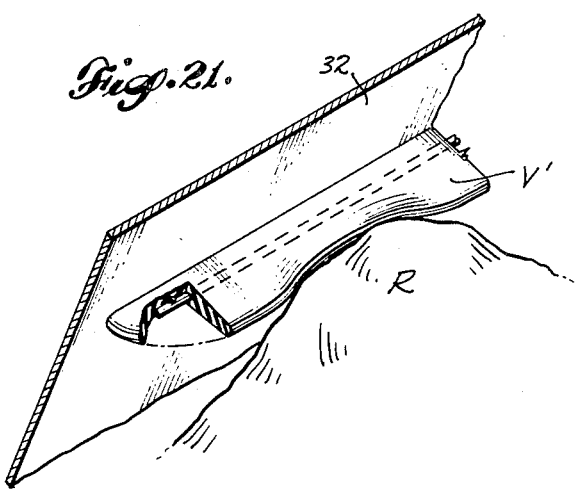
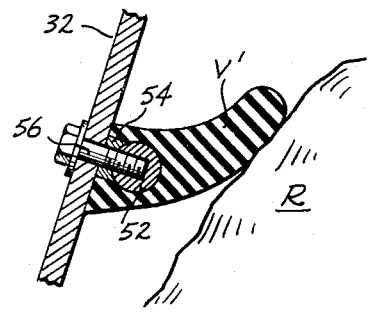
INVENTOR.
FRANK J. LUKETA

United States Patent Office 3,247,612
Patented Apr. 26, 1966

3,247,612
TRAWL DOOR WITH LONGITUDINAL ANTERIOR VANES
Frank J. Luketa, 5567 Greenwood Ave. N., Seattle, Wash.
Filed Aug. 31, 1964, Ser. No. 393,254
9 Claims. (Cl. 43—9)

This application is a continuation-in-part of my copending application Serial No. 52,140, filed August 26, 1960, now abandoned, and entitled Multisectional Trawl Door Construction.

The present invention relates to trawl doors, and more particularly to the provision of guide vanes on the anterior surface of the water reaction panel, for guiding or directing the water essentially straight rearwardly as it flows relatively across such surface.

Trawl doors are employed in pairs, one on each side of the trawl net. They function to spread apart the side elements of netting that precede and lead fish into the body of the net. Each trawl door is towed in the water in a generally upright position, with its leading or anterior surface at an angle to the direction of tow. The water contacting the anterior surfaces of the doors is deflected thereto and accelerated into a new direction, creating reaction forces having laterally outwardly directed components which tend to move the doors apart and open the mouth of the net.

The magnitude of the lateral force on each door produced by water reaction is dependent in part upon the quantity of water which flows relatively across the anterior face of the water reaction panel, and also in part upon the extent to which such water has its direction of travel changed by the water reaction panel. It is a principal object of the present invention to provide a trawl door that is especially adapted to turn or change the direction of travel of essentially all of the water which contacts the anterior face of its water reaction panel to the full extent made possible by the angle of attack and in some cases the fore and aft curvature of such panel.

In my prior U.S. Patent No. 3,048,936, issued August 14, 1962, I disclose a trawl door having a water reaction panel which in vertical section is of shallow V configuration. The towing warp for such door is attached to the door bridle at a point downwardly offset from the horizontal center of the water reaction panel, causing the water thrust against the upwardly facing panel portion to be greater than the water thrust against the downwardly facing panel portion, and resulting in the creation of a downwardly directed resultant which acts to depress the door in the water. In this manner a light weight door, with all its advantages of lower cost, easy handling out of water, etc., can be made to hold the bottom as well as, or even perhaps better than, a much heavier door.

In my copending application Serial No. 219,276, filed August 24, 1962, and entitled Trawl Doors, I disclose a tilting door which in vertical section possesses a trihedral rather than a dihedral or shallow V configuration. However, such door still possesses upward and lower panel portions which are dihedrally related and which during trawling function to cause door depression in the same manner as the upper and lower panel portions of the said door enclosed in my aforementioned U.S. Patent No. 3,048,936. This downward suppression effect may also be created by a tilting door having a water reaction panel with a vertically arcuate (i.e. rounded arch) anterior face.

One disadvantage of a water reaction panel that is swept back on its leading face about a horizontal center portion is that some of the water moving relatively across the anterior surface of the water reaction panel tends to veer out of a straight rearward path of travel and move either upwardly to spill over the upper edge of the panel or downwardly to flow against the bottom. When this happens a part of the useful energy of such water is lost to the door. This is because all of the water which has contacted the water reaction panel has not had its direction of relative travel changed to the full extent made possible by the angle of attack and shape of the panel.

According to the present invention, a plurality of horizontally extending guide vanes are provided in at least those regions of the water reaction panel that are swept back or angled rearwardly from vertical, such vanes serving to channel the water essentially straight back across the leading faces of such portions of the panel, resulting in essentially all of the water that contacts the panel having its direction of travel changed to the full extent allowed by the angle of attack and fore and aft curvature of the panel.

According to the invention, in one form the guide vanes are made an integral part of the water reaction panel by either casting them with the panel when it is formed, or by welding them to the panel after its formation. Alternate forms include making the vanes separable from and detachably securable to the water reaction panel, as by the use of studs or bolts. Also, the vanes may be constructed from a tough, wear-resistant but resilient material so that they are deformable and will momentarily deform or change shape upon striking underwater objects rather than break or permanently deform.

These and other characteristics, features, objects and advantages of the present invention will be apparent from the following description of certain typical embodiments thereof, taken together with the accompanying illustrations wherein like letter designations and like numerals refer to like parts, and wherein:

FIG. 1 is a perspective view of a starboard door constructed in accordance with the present invention, as viewed from the leading or anterior side thereof, such door comprising a water reaction panel which is of concave curvature fore and aft and of convex curvature (more specifically—trihedral) vertically on its anterior side;

FIG. 2 is a perspective view of the port side mate of the trawl door shown in FIG. 1, such view being taken from the rearward or posterior side of the port door;

FIG. 3 is a top plan view of a door of the same type as the one shown by FIGS. 1 and 2, but which does not possess guide vanes on the anterior side of the water reaction panel, such view including arrows which indicate the "spill over" of water which occurs when the guide vanes are not used;

FIG. 4 is a side elevational view of the door of FIG. 3, taken toward the leading or anterior side thereof, and also including arrows indicating the flow of some of the water towards the upper and lower edges of the door;

FIG. 5 is a sectional view taken substantially along line 5—5 of FIG. 3, and showing the roll bar in rear elevation, such view also including arrows depicting generally the direction of flow of water relatively across the anterior face of the water reaction panel;

FIG. 6 is a view similar to FIG. 3, but of a door having guide vanes on the anterior surface of its water reaction panel, such view showing by the use of arrows the channeling effect which the guide vanes have on the water;

FIG. 7 is a view like FIG. 4, but of the guide vane equipped door of FIG. 6;

FIG. 8 is a view like FIG. 5, but of the guide vane equipped door of FIGS. 6 and 7;

Figure 9:
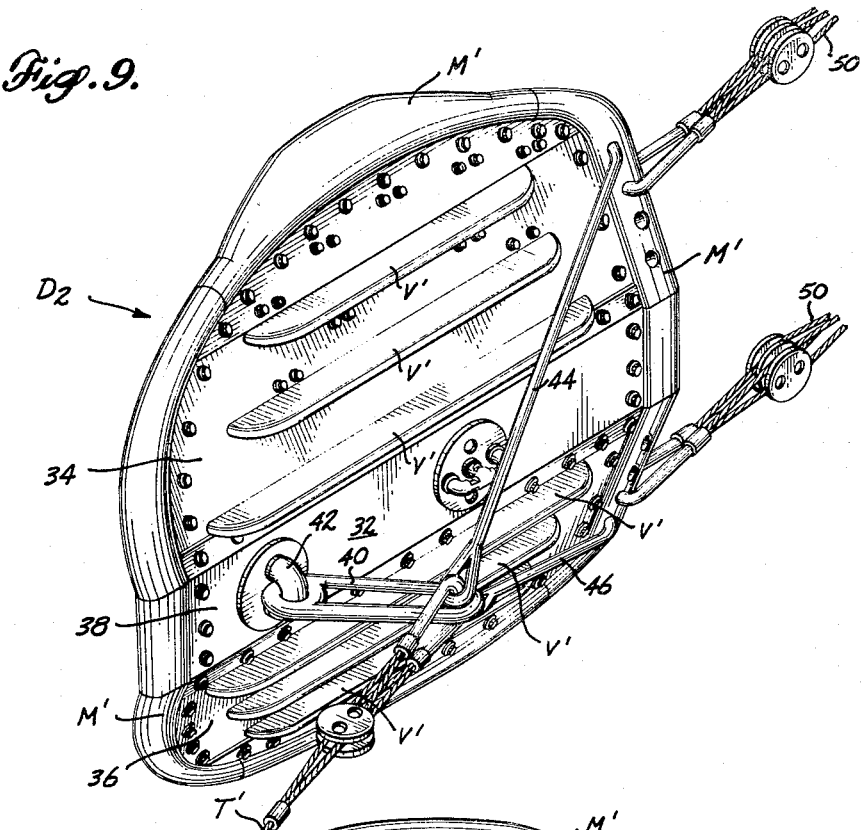
FIG. 9 is a view like FIG. 1, but of a modified form of door, involving a water reaction panel that is straight fore and aft, but like the door shown by FIGS. 1–8 is of convex form vertically on the leading or anterior side of the water reaction panel.
Figure 10:
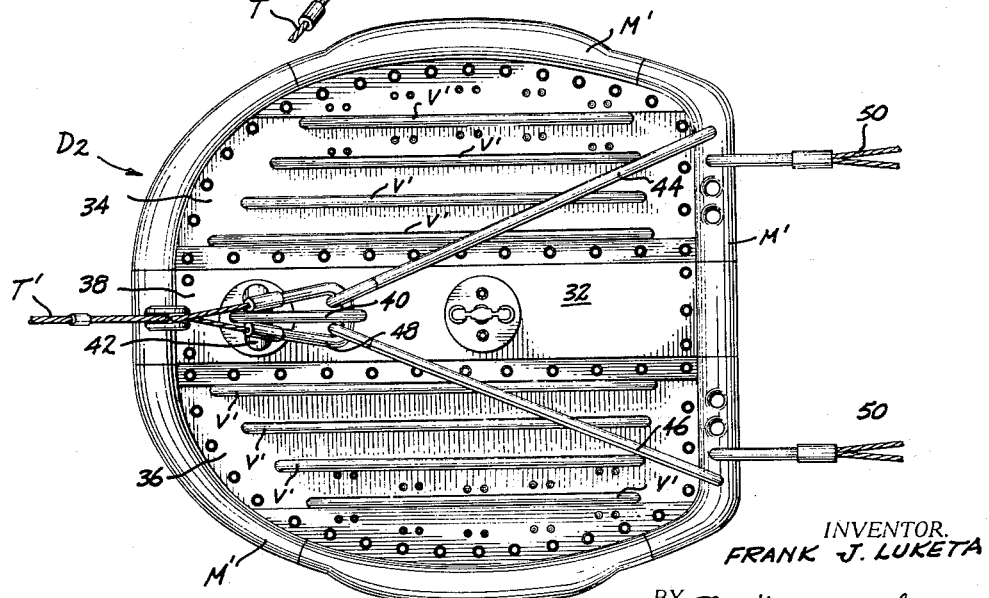
FIG. 10 is a front elevational view of the door of FIG. 9.
Figure 11:
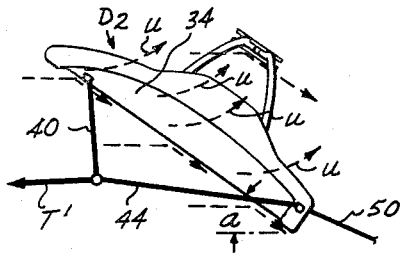
FIGS. 11, 12 and 13 are top plan, front elevational, and end elevational view respectively, of the door form of FIGS. 9 and 10, but without the guide means on the anterior side of the water reaction panel, such view including arrows depicting in a general manner the flow pattern of the water relatively across the anterior surface of the water reaction panel.
Figure 14:
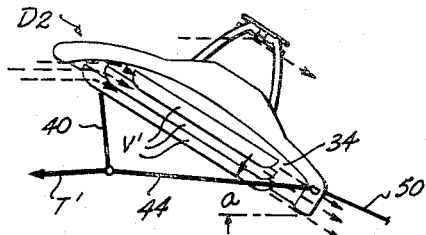
Figure 12:
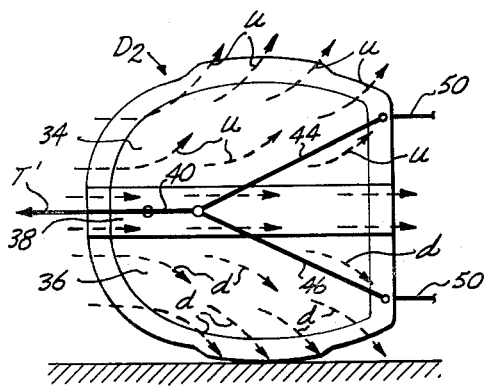
Figure 15:
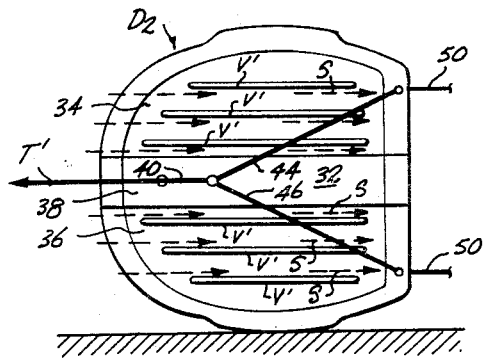
Figure 13:
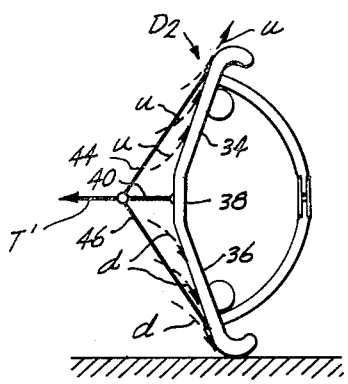
Figure 16:
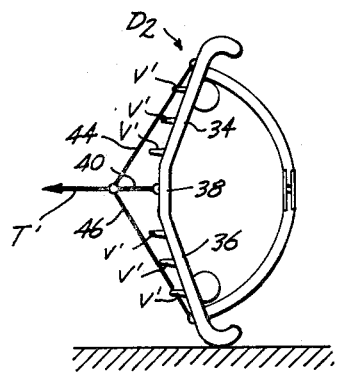

FIGS. 14, 15 and 16 are top plan, front elevational, and rear elevational views, respectively, and respectively like the views of FIGS. 11, 12 and 13, but of a door that is equipped with guide vanes on the anterior surface of the water reaction panel, with FIGS. 14 and 15 indicating generally the flow pattern established by the guide vanes;

FIG. 17 is a fragmentary top plan view, partially in section, of one form of anterior guide vane, which form is cast as an integral part of the water reaction panel;

FIG. 18 is a view taken substantially along line 18—18 of FIG. 17;

FIG. 19 is a view like FIG. 17, but of a modified form of anterior guide vanes, which is characterized by a resilient body portion formed in situ about a longitudinally extending mounting rod, such form of anterior guide vane being detachably secured to the water reaction panel by means of a plurality of bolts;

FIG. 20 is a sectional view taken substantially along line 20—20 of FIG. 19.

FIG. 21 is a fragmentary perspective view of an intermediate portion of a trawl door incorporating anterior guide vanes of the type shown by FIGS. 19 and 20, such view showing one of the guide vanes deforming upon being contacted by a submerged rock; and FIG. 22 is a view like FIG. 20, but showing the new cross-sectional configuration assumed by the anterior guide vane when it is momentarily deformed as a result of its having made contact with the submerged rock.

Turning now to a more specific consideration of the invention as typified by the illustrated embodiments, the particular form of trawl door D1 shown by FIGS. 1 and 2, for example, comprises a sectional water reaction panel 10, which in vertical section is of a trihedral configuration with symmetrical panel portions 12, 14 situated respectively above and below a central panel portion 16, the vertical center of which preferably coincides with the vertical center of the entire panel 10. The upper and lower portions 12, 14 of the panel 10 are swept back substantially on the leading or anterior face of the panel 10, and such panel portions 12, 14 have an angle therebetween of about 140° on the trailing or posterior side of the panel 10. As shown, the door panel 10 is also curved fore and aft, with the anterior surface thereof being of concave curvature.

A bridle assembly to which a towing warp T is anchored extends outwardly from the anterior surface of the panel 10 and is illustrated as comprising a single forward leg 18 and a pair of rear legs 20, 22, respectively.

A plurality of attitude control attachments in the form of buoyancy units 24, ballast units 26, and a roll bar 28 are secured to the posterior side of the panel 10, as illustrated. The buoyancy units 24 and the ballast units 26 are provided in such a number and arrangement to effect the desired disposition or attitude of the door during trawling. The roll bar 28 prevents the door from falling over on its posterior side and lying flat on the bottom in a position wherein it is difficult or practically impossible to right it and cause it to assume a proper disposition or attitude without hauling the doors off the bottom and then paying out again.

The sectional panel trawl door D1 forms the subject matter of a copending application Serial No. 393,026, filed August 31, 1964, and entitled Trawl Doors Consisting of Components Usable to Make Up Various Size Doors. Reference is made to such copending application for a more specific description of the sectional water reaction panel 10, the marginal edging M, and the bridle assembly. The particular type of buoyancy units 24 and ballast units 26 that are illustrated represent typical embodiments of the buoyancy and ballast means forming the subject matter of my copending application Serial No. 376,993, filed June 22, 1964, and entitled Ballast and Buoyancy Attachments for Trawl Doors. The roll bar 28 in part forms the subject matter of my copending application Serial No. 393,139, filed August 31, 1964, and entitled Self-Uprighting Trawl Doors. To the extent necessary to a clearer understanding of the principles of the present invention, the contents of the above applications are incorporated herein by reference.

Referring again to FIG. 1, according to the present invention, a plurality of vertically spaced, generally horizontally extending vanes V are situated on the anterior face of the panel 10, at least in the swept back portions 12, 14 thereof. These vanes V serve to channel the water that flows relatively across such surface portions 12, 14 into generally fore and aft directed streams. As a result, substantially all of the water that comes into contact with the anterior surface of the panel 10 has its direction of movement changed to the full extent made possible by the curvature of said anterior surface.

FIGS. 3–5 diagrammatically illustrate what happens when the door D1 is devoid of anterior vanes V. As indicated generally by arrows $u$, the water striking the upper panel portion 12 tends to follow the vertical as well as the horizontal curvature of such portion 12, and instead of flowing straight rearwardly (and horizontally) along such anterior surface portion 12, it veers upwardly as it moves relatively rearwardly and tends to spill over the upper edge of the door. As indicated generally by the arrows $d$, the water contacting the anterior surface of lower panel portion 14 is also influenced by its vertical curvature, and is turned downwardly thereby.

For maximum efficiency, all of the water that contacts and flows relatively across the anterior face of panel 10 must flow the entire length of such panel 10 and have its direction of movement changed to the full extent made possible by the angle of attack and the fore and aft curvature of the panel 10. The anterior vanes V are provided for this purpose. As explained above, they serve to channel the water into well defined streams. This is illustrated diagrammatically in FIGS. 6–8 where the arrows $s$ are used to generally indicate the flow pattern of the water caused by the vanes V.

The polyhedral cross-sectional configuration of the panel 10 was not arbitrarily chosen, but rather performs a very important part in the functional operation of the door D1. As shown by FIG. 8, during trawling the door D1 is towed in the water in a generally, but not an exactly, upright position. The arrangement or rigging of the towing warp T, the bridle members 18, 20, 22, and the net lines 30 which extend rearwardly from the door D1 to the net (not shown) are such as to cause the door D1 to assume a slightly rearwardly leaning attitude during trawling. This condition is illustrated in FIG. 8 wherein the door D1 is shown leaning rearwardly from a plumb vertical line P by the angular amount $x$. As a result, the downwardly acting component of force F1, tending to suppress the door D1 and hold its lower edge on the bottom, is larger than the upwardly acting force F2 which has a lifting force on the door. This is because the slope of the anterior surface of panel portion 12 is less than the slope of the anterior surface of panel portion 14. For a more detailed treatment of door tilting, reference is made to my aforementioned U.S. Patent No. 3,048,936, and to my aforementioned application Serial No. 219,276.

FIGS. 9–16 depict a modified form of trawl door, designated D2. It comprises a water reaction panel 32, which in vertical section is preferably of a trihedral configuration, with symmetrical, substantially planar, panel portions 34, 36 situated respectively above and below a substantially planar central portion 38. Whereas water reaction panel 10 of door D1 is curved fore and aft, the water reaction panel 32 is generally straight fore and aft. In other words, in horizontal section it is generally straight.

The towing warp bridle for door D2 may comprise a rigid forward leg 40 pivotally connected to the forward portion of central panel 38 by means of a U-shaped mounting member 42, and attached at its outboard end to the respective forward terminals of a pair of flexible rear leg members 44, 46 and the rear terminal of the towing warp T' by means of a flexible shackle 48. The rear leg members 44, 46 diverge apart as they extend rearwardly towards the rear edge of the door D2. At the upper rear corner of the door D2 leg member 44 extends through an opening in the marginal edging M' extending along the rear edge of the door and connects at its after terminal to an eye member (not shown) situated on the posterior side of the door D2. Similarly, leg member 46 extends through an opening formed in the lower rear corner portion of the door and is attached at its rear terminal onto another eye member situated on the posterior side of the door D2. A pair of net lines 50 are also attached to the rear edge portion of the door D2.

According to the present invention, a plurality of vertically spaced, generally horizontally extending guide vanes V' extend outwardly from the swept back, upper and lower panel portions 34, 36, and serve to channel the water moving relatively across the leading surface of the door into rearwardly flowing fore and aft streams.

FIGS. 11–13 diagrammatically illustrate a general flow pattern of the water relatively across the leading face of a fore and aft straight door of the same type as door D2, but which is not provided with anterior vanes V'. As in the case of door D1, the water striking the upper panel portion 34 tends to flow upwardly (as indicated by arrows $u$) as well as rearwardly, due to the rearwardly and upwardly sloping attitude of such panel portion 34, with a portion of such water spilling over the upper edge of the door D2 before its direction of travel has been changed an angular amount equal to the angle of attack $a$ of the panel 32. Below the horizontal center line of the door, the water striking the lower panel portion 36 tends to flow downwardly as well as rearwardly (see arrows $d$), with the same consequence. FIGS. 14 and 15 diagrammatically illustrate that the anterior vanes V' function to channel at least the greater portion of the water into generally horizontal streams $s$ across the anterior faces of panel portions 34, 36, resulting in such water having its direction of travel changed to the full extent made possible by the angle of attack $a$ of the panel 32.

In FIGS. 11–16, the door D2 is shown to be vertically disposed. However, it is to be understood that it can be, and indeed in some instance preferably is, made to lean slightly rearwardly, such as the door D1 (FIG. 8, for example), and for the same reason.

As will be evident, the anterior vanes V' of the present invention may be also used with great advantage on a trawl door having a dihedral or shallow V configuration in vertical section, such as the door disclosed in my aforementioned U.S. Patent No. 3,048,936. Also, such vanes V' (or V) may be employed on a door panel that has a swept back, vertically arcuate (rounded arch) leading surface. Herein the term "vertically convex," when used to describe the vertical shape or configuration of the anterior surface of a door panel, is used to mean any of the shapes which produce rearwardly swept back upper and lower panel portions, including a dihedral, a trihedral, etc. and a rounded curve or arcuate shape.

The anterior vanes V, V' may be cast integrally with the door panel itself (FIGS. 17 and 18), may be formed separately from the door panel and then permanently affixed thereto, as by welding, for example, or may be made separately from the door panel and then merely bolted thereto, so as to be removable.

FIGS. 19–22 illustrate one type of anterior vane V' that is constructed from a resilient, wear-resistant material, such as cured rubber, so that when such vanes V' are contacted by an underwater obstacle, such as the rock R, they will merely momentarily deform, rather than break or permanently deform. FIG. 20 shows such a vane V' in its natural or unstressed condition, and FIG. 22 shows the same vane V' deformed somewhat when its outboard edge portion is pressed against the rock R.

Preferably, vane V' is provided with a metal core or mounting rod 52 extending lengthwise of the vane V' in the inboard edge or base portion thereof. The core 52 is formed to include a plurality of projections 54 which extend toward the door panel (10 or 32). Studs or screws 56 are inserted from the posterior side of the panel, through openings therein, and screw into an internally threaded bore formed in the projections 54. The body portion of rubber or like material may be cast in situ about the mounting rod or core 52.

From the foregoing, various further modifications, arrangements and adaptations of trawl doors and trawl door panels with anterior vanes according to the present invention will occur to those skilled in the art to which the invention is addressed, within the scope of the following claims.

What is claimed is:

1. A trawl door comprising a water reaction panel having a vertically convex anterior surface; towing warp securement means on the anterior side of said panel for use in towing the door in the water in a generally upright position and at a desired angle of attack; and a plurality of vertically spaced, generally horizontally disposed vanes projecting outwardly from said anterior surface and extending throughout a greater part of the length of said panel, and serving to divert at least some of the water that flows relatively across said anterior surface into a generally fore and aft direction.

2. A trawl door according to claim 1, wherein the water reaction panel possesses a polyhedral shape in vertical section substantially throughout its length.

3. A trawl door according to claim 1, wherein the water reaction panel possesses a trihedral shape in vertical section substantially throughout its length.

4. A trawl door according to claim 1, wherein the anterior vanes are formed of a resilient, rubber-like, material, capable of deforming under load and substantially regaining its original shape when the load is removed.

5. A trawl door according to claim 4, wherein said vanes include means for detachably connecting them onto the water reaction panel, which means comprises an elongated mounting member extending longitudinally through said resilient material, and a plurality of screw means extending from the posterior side of the panel, through openings formed in said panel, and threading into internally threaded openings formed in said mounting member.

6. A trawl door comprising a water reaction panel having a vertically convex, horizontally concave, anterior surface, and including swept back panel portions both above and below the vertical center of the panel; towing warp securement means on the anterior side of said panel; and a plurality of vertically spaced, generally horizontally disposed guide vanes, projecting outwardly from the swept back portions of said anterior surface and extending throughout a greater portion of the length of said panel, and serving to channel the water that flows relatively across such surface portions into generally fore and aft directed channels, whereby at least some of the water that comes into contact with the anterior surface of the water reaction panel has its direction of flow changed to conform to at least some of the fore and aft curvature of said anterior surface.

7. A trawl door according to claim 6, wherein said water reaction panel possesses a polyhedral shape in vertical section, substantially throughout its length.

8. A trawl door according to claim 7, wherein said water reaction panel and the anterior vanes are integrally formed from cast structural aluminum.

9. A bottom trawl door comprising a water reaction panel of polyhedral configuration in vertical section, substantially throughout its length, and having an anterior surface that is swept back rearwardly both above and below the vertical center of said panel; means for dragging said door along the bottom including a bridle connected to and extending forwardly from said anterior surface, and towing warp means connected to said bridle ahead of the mid point of and somewhat below the vertical center of the panel, so as to maintain the upper edge of the door tilted rearwardly with respect to the lower edge thereof; and a plurality of vertically spaced, generally horizontally disposed vanes extending outwardly from said swept back portions of the anterior surface of said panel, said vanes serving to channel at least some of the water that flows relatively across the anterior surface of the panel into generally fore and aft directed streams.

References Cited by the Examiner

UNITED STATES PATENTS

| | | | |
|---|---|---|---|
| 829,608 | 8/1906 | Stanton. | |
| 2,066,519 | 1/1937 | Clark | 43—9 |
| 2,522,191 | 9/1950 | Pillow | 43—44.96 |
| 2,689,425 | 9/1954 | De Veen | 43—9 |
| 2,942,371 | 9/1958 | Johnson et al. | 43—9 |

SAMUEL KOREN, *Primary Examiner.*

F. RAY CHAPPELL, ABRAHAM G. STONE,
*Examiners.*